(12) United States Patent
Ainley et al.

(10) Patent No.: US 11,371,262 B2
(45) Date of Patent: *Jun. 28, 2022

(54) METHOD AND APPARATUS FOR DEADBOLT POSITION SENSING

(71) Applicant: Schlage Lock Company LLC, Carmel, IN (US)

(72) Inventors: William B. Ainley, Carmel, IN (US); David M. Baty, Indianapolis, IN (US); David Newby, Avon, IN (US); Justin D. Seacat, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 293 days.

This patent is subject to a terminal disclaimer.

(21) Appl. No.: 16/696,376

(22) Filed: Nov. 26, 2019

(65) Prior Publication Data

US 2020/0240175 A1 Jul. 30, 2020

Related U.S. Application Data

(63) Continuation of application No. 15/872,806, filed on Jan. 16, 2018, now Pat. No. 10,487,544.

(51) Int. Cl.
*E05B 47/00* (2006.01)
*G01B 7/00* (2006.01)
*G01D 5/12* (2006.01)

(52) U.S. Cl.
CPC .......... *E05B 47/0012* (2013.01); *G01B 7/003* (2013.01); *G01D 5/12* (2013.01);
(Continued)

(58) Field of Classification Search
CPC ................ E05B 47/00; E05B 47/0012; E05B 2047/002; E05B 207/0024;
(Continued)

(56) References Cited

U.S. PATENT DOCUMENTS 4,810,014 A 3/1989 McGourty et al.
5,946,956 A 9/1999 Hotzl
(Continued)

OTHER PUBLICATIONS

Canadian Office Action; Canadian Intellectual Property Office; Canadian Patent Application No. 3,092,082; dated Sep. 17, 2021; 5 pages.
(Continued)

*Primary Examiner* — Suzanne L Barrett
(74) *Attorney, Agent, or Firm* — Taft Stettinius & Hollister LLP

(57) ABSTRACT

The present disclosure is directed to an electronic deadbolt control system including a deadbolt configured to extend or retract between a locked position and an unlocked position, respectively. An output shaft connected between a final gear and the deadbolt is configured to transmit an actuation force to the deadbolt from an electric motor. A first magnet and a second magnet are associated with the final gear to define a home position for either a left hand deadbolt or a right hand deadbolt. A cam is positioned on the output shaft to engage with a switch such that, in combination with a threshold current motor output, the control system determines whether the deadbolt is in an extended position or a retracted position. A thumb-turn shaft is disengaged from the final gear in the home position to permit manual actuation of a thumb-turn.

25 Claims, 7 Drawing Sheets

(52) U.S. Cl.
CPC . *E05B 2047/002* (2013.01); *E05B 2047/0024* (2013.01); *E05B 2047/0069* (2013.01)

(58) Field of Classification Search
CPC ..... E05B 2047/0069; E05B 2047/0036; E05B 2047/0092; E05B 47/026; E05B 63/04; E05B 63/044; Y10T 70/5212; Y10T 70/7062; Y10T 70/7113; Y10T 70/7915; Y10T 70/8838; G01B 7/003
USPC .................................................. 70/275, 280
See application file for complete search history.

(56) References Cited

U.S. PATENT DOCUMENTS

| | | | |
|---|---|---|---|
| 6,022,056 A | 2/2000 | Cope et al. | |
| 6,089,058 A | 7/2000 | Elpern et al. | |
| 6,918,276 B2 | 7/2005 | Van Parys | |
| 7,069,755 B2 | 7/2006 | Lies et al. | |
| 7,096,697 B2 | 8/2006 | Keightly | |
| 8,621,900 B2 | 1/2014 | Wu et al. | |
| 8,677,792 B2 | 3/2014 | Wheeler | |
| 8,683,833 B2 | 4/2014 | Marschalek et al. | |
| 9,322,194 B2 | 4/2016 | Cheng et al. | |
| 9,790,711 B2 | 10/2017 | McKibben et al. | |
| 9,790,736 B2 | 10/2017 | Kincaid et al. | |
| 10,487,544 B2 * | 11/2019 | Ainley | E05B 47/026 |
| 2006/0283219 A1 | 12/2006 | Bendz et al. | |
| 2009/0066320 A1 | 3/2009 | Posey | |
| 2011/0185554 A1 | 8/2011 | Huang et al. | |
| 2012/0073338 A1 | 3/2012 | Mohla | |
| 2013/0192316 A1 | 8/2013 | McKibben et al. | |
| 2016/0145904 A1 | 5/2016 | Lowder | |
| 2016/0155593 A1 | 6/2016 | Gerovac | |
| 2016/0319569 A1 | 11/2016 | Johnson et al. | |
| 2016/0343181 A1 | 11/2016 | Cheng et al. | |
| 2017/0022735 A1 | 1/2017 | Lowder | |

OTHER PUBLICATIONS

International Search Report; ISA/US; International Application No. PCT/US2019/013616; dated Apr. 12, 2019; 3 pages.

Written Opinion of the International Searching Authority; ISA/US; International Application No. PCT/US2019/013616; dated Apr. 12, 2019; 9 pages.

* cited by examiner

METHOD AND APPARATUS FOR DEADBOLT POSITION SENSING

CROSS-REFERENCE TO RELATED APPLICATIONS

The present application is a continuation of U.S. patent application Ser. No. 15/872,806 filed Jan. 16, 2018 and issued as U.S. Pat. No. 10,487,544, the contents of which are hereby incorporated by reference in their entirety.

TECHNICAL FIELD

The present disclosure generally relates to a deadbolt control and position sensing system for an auto-throw deadbolt or the like.

BACKGROUND

Determining a position and control of a deadbolt through electronic means can be desirable in an electronic deadbolt locking mechanism. Some existing systems, methods and apparatuses are expensive, unreliable and require relatively high electric power to operate. Accordingly, there remains a need for further contributions in this area of technology.

SUMMARY

One embodiment of the present disclosure includes a deadbolt control and sensing apparatus with a final gear having first and second magnets to indicate home positions for a left handed door and a right handed door, respectively. Other embodiments include apparatuses, systems, devices, hardware, methods, and combinations for controlling and determining a position of a deadbolt in an electronic lock apparatus. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
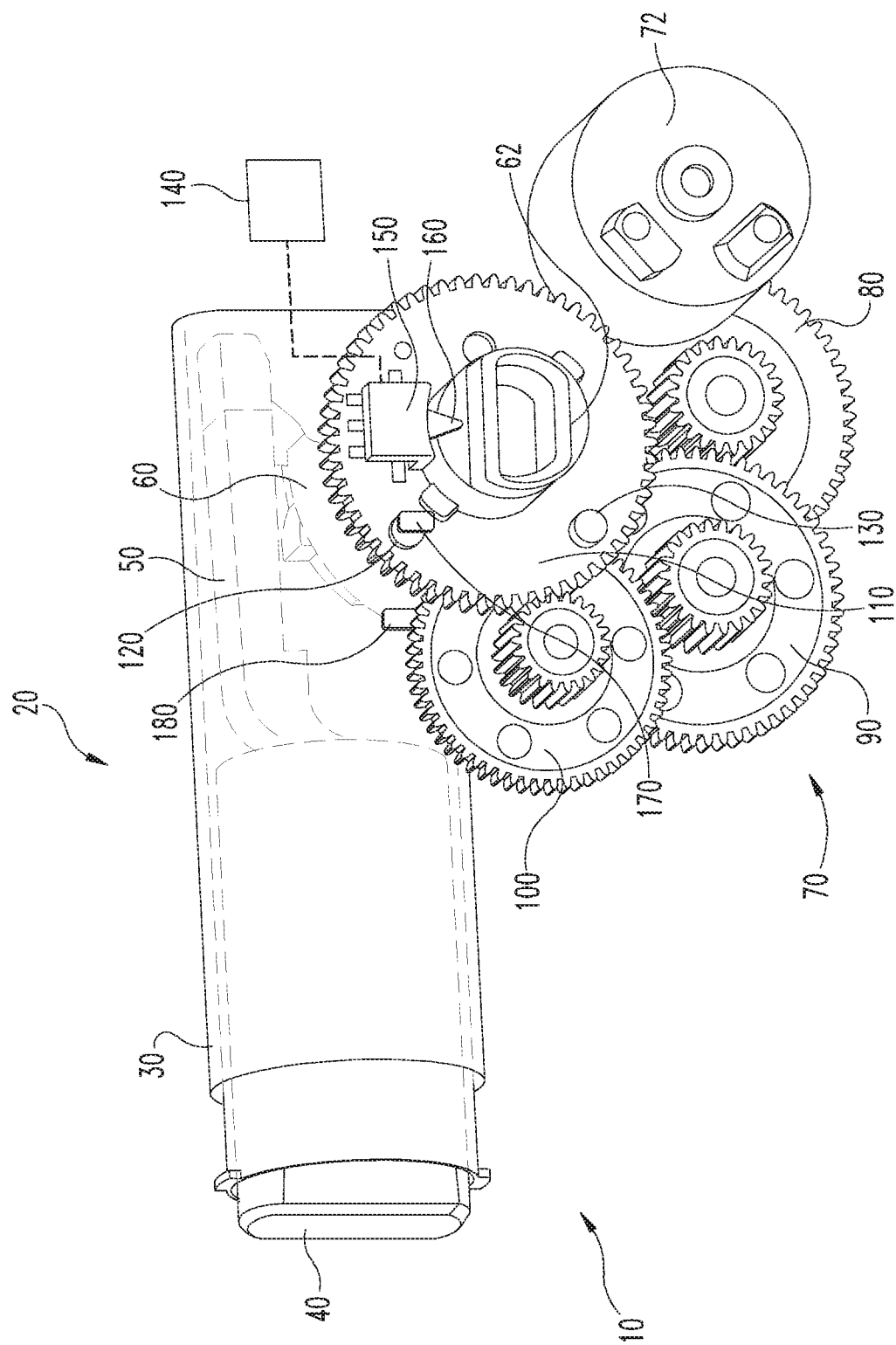
FIG. 1 is a perspective view of a deadbolt drive assembly with the deadbolt in a retracted or unlocked position and a final gear in a home position.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
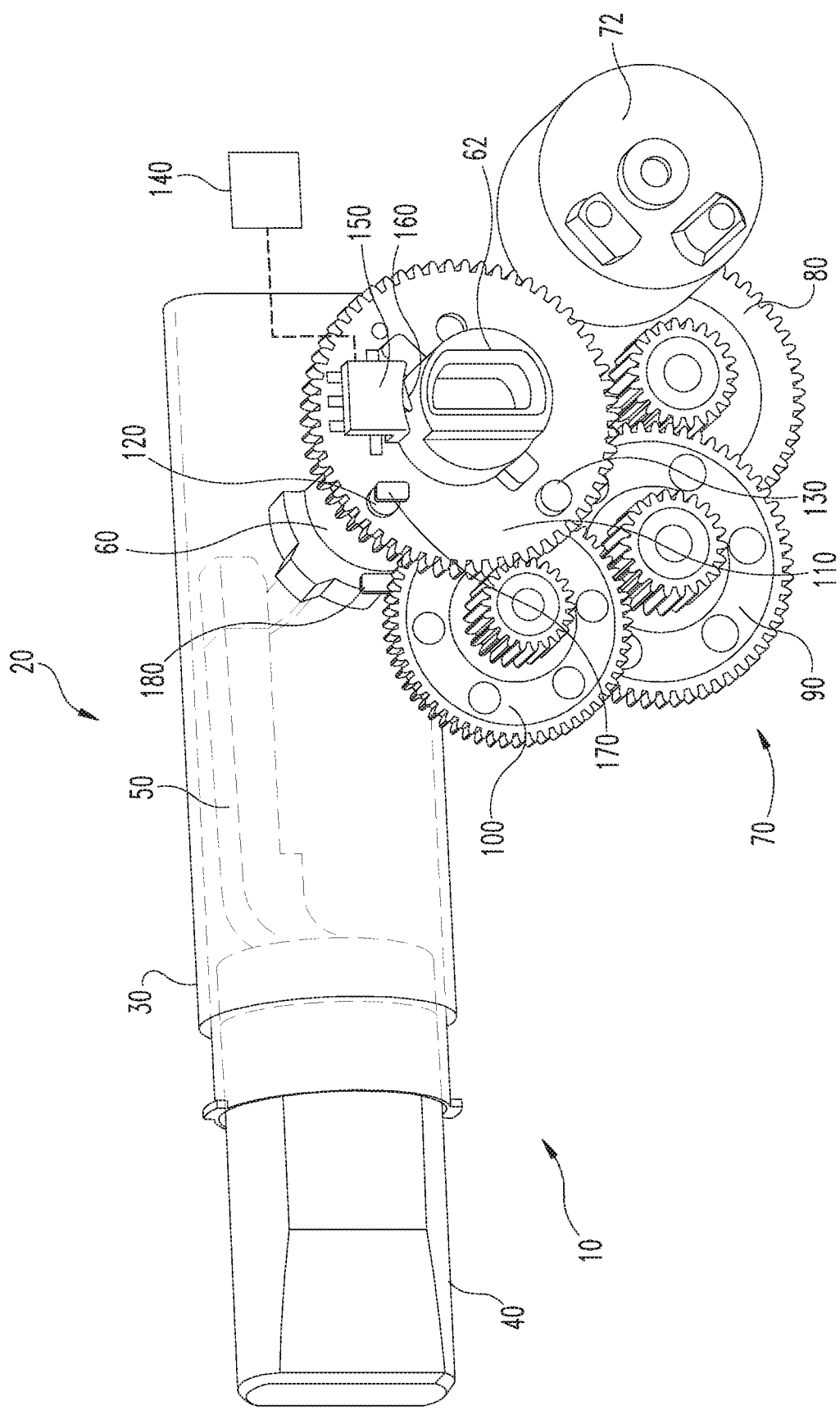
FIG. 2 is a perspective view of the deadbolt drive assembly of FIG. 1 with the deadbolt in an extended or locked position and the final gear in the home position.

Referring now to FIGS. 1 and 2, perspective views of a deadbolt drive assembly 10 are illustrated in an unlocked and a locked configuration, respectively. The deadbolt drive assembly 10 includes a deadbolt mechanism 20 that includes a housing 30, a deadbolt 40 and a driver bar 50 operably connected to a rotatable output shaft 60. The rotatable output shaft 60 is operably connected to a gear train 70. The rotatable output shaft 60 also includes a cam 62 operably coupled thereto. The gear train 70 can include one or more gears, and the disclosed embodiment includes a first gear 80, a second gear 90, a third gear 100, and a fourth or final gear 110. The final gear 110 is coupled to the output shaft 60 such that when a motor 72 rotates in one direction or the other, the gear train 70 will either lock or unlock the deadbolt 40. In the locked position, the deadbolt 40 is in an extended position and in the unlocked position, the deadbolt 40 is in a retracted position. The final gear 110 includes a first magnet 120 operably attached or coupled thereto and a second magnet 130 spaced apart from the first magnet also operably coupled thereto. Each of the first and second magnets 120, 130 define a home position for the deadbolt drive assembly 10 in either a left hand configuration or a right hand configuration. The left hand and right hand refer to which side of the door that the deadbolt assembly 10 is located.

A calibration procedure can determine whether the deadbolt drive assembly 10 is in an extended or retracted configuration. The first and second magnets 120, 130 are oriented on the final gear 110 so that they have opposite or reverse polarities. For example, if the first magnet 120 has a positive pole facing in one direction, then the second magnet 130 will have a negative pole facing in that same direction. Although not shown, the deadbolt drive assembly 10 can include a control module housing to hold various components of the electronic control system used to calibrate and control the locking and unlocking operation.

A process controller 140 operable for receiving and transmitting command signals and perform computational processing may be located in the control module. A flipper switch 150 is in electrical communication with the process controller 140. The flipper switch 150 includes a pivot finger 160 that is engageable with the cam 62 on the output shaft 60. The pivot finger 160 will be pivotably placed in one direction or the other based on the direction that the electric motor 72 rotates the gear train 70 which will be described in more detail below. The control module housing can also include a primary magnetic sensor 170 for sensing a magnetic flux of the first and second magnets 120, 130 as the magnets rotate in proximity to the primary magnetic sensor 170 during operation of the gear train 70. The primary magnetic sensor 170 may be a Hall effect sensor in certain embodiments. A secondary magnetic sensor 180 operates as a tamper detection magnetic sensor. The tamper detection magnetic sensor 180 is positioned far enough away from the first and second embedded magnets on the final gear 110 so as not to trigger a detection, however close enough to that of the primary magnetic sensor 170 to detect a tampering magnet. The tamper detection magnetic sensor 180 is in electrical communication with the process controller 140, similarly to that of the primary magnetic sensor 170. The control system can be configured to automatically prevent unlocking of the deadbolt drive assembly 10 when the tamper detection magnetic sensor 180 senses a magnet external to the control system module. In this manner, the control system prevents an unauthorized person from "fooling" the control system into unlocking the deadbolt drive assembly 10 without the proper electronic credentials.

Figure 3:
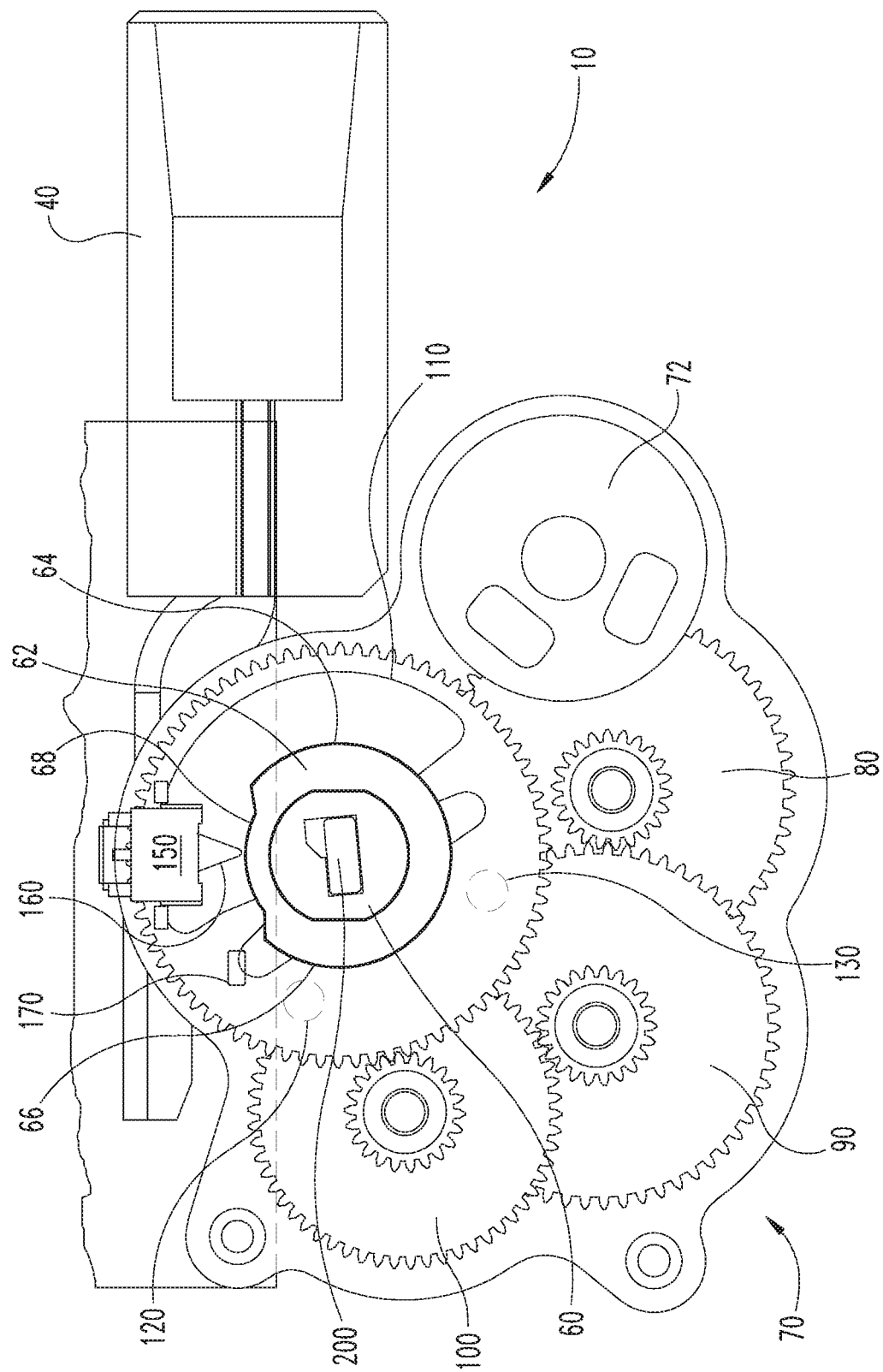
FIG. 3 is a cross sectional view of the deadbolt drive assembly of FIG. 1 with the deadbolt in a retracted or unlocked position with the final gear angularly displaced from the home position.

Referring now to FIG. 3, a cross-sectional view of the deadbolt drive assembly 10 is shown in a retracted or unlocked configuration and the final gear 110 is positioned away from a home position. The home position defines a position of the final gear 110 that permits a thumb-turn shaft 200 to rotate and lock or unlock the deadbolt 40. A thumb-turn lever (not shown) can be connected to the thumb-turn shaft 200 so as to permit manual locking or unlocking of the deadbolt drive assembly 10, as is commonly done with lock systems. The deadbolt drive assembly 10 is in a home position when one of the magnets 120, 130 are aligned with the primary magnetic sensor 170. When the final gear 110 is not in a home position, the thumb-turn shaft 200 is lockingly engaged through the output shaft 60 and the gear train 70 and is prevented from rotating independently of the final gear 110. In the home position, the thumb-turn shaft 200 is free to lock or unlock the deadbolt through manual actuation. The first magnet 120 can be configured to define the home position for the left handed deadbolt drive assembly 10, and the second magnet 130 can be configured to define a home position for a right handed deadbolt drive assembly 10. Alternatively, the first and second magnets 120, 130 can be reversed so that they can define an opposite handing assembly.

The cam 62 includes a right hand actuation profile 64, a left hand actuation profile 66 and a center profile 68 positioned between the right hand profile 64 and the left hand actuation profile 66. The left and right cam profiles 64, 66 have a radius large enough to engage with the pivot finger 160 of the flipper switch 150. The center cam profile 68 has a smaller radius such that the pivot finger 160 of the flipper switch 150 will not engage therewith. The output shaft 60 can be rotated counter-clockwise with the electric motor 72, such that the right hand actuation profile 64 will engage with the pivot finger 160 causing the pivot finger 160 to pivot to the left in a clockwise direction about a pivot axis within the flipper switch 150. Likewise, when the output shaft 60 is rotated in a clockwise direction with the electric motor 72, the pivot finger 160 will pivot to the right in a counter-clockwise direction about its pivot axis. The direction that the pivot finger 160 pivots depends on the direction of rotation of the output shaft 60. The flipper switch 150 sends a signal to the controller and the control system uses this information to determine where the deadbolt 40 is currently positioned. The right hand profile 64 and the left hand profile 66 engages with the pivot finger 160 at approximately 60% of the total deadbolt 40 travel to an extended position. This is defined as distance whereby the deadbolt 40 will have initially become engaged within the locking slot of a door jam (not shown) or the like. In that manner, once the pivot finger 160 is actuated, the control system signals that the deadbolt 40 has entered into a locking slot. When the electric motor current reaches a threshold limit, the control system will signal that the deadbolt 40 has reached a maximum travel location and the control system will stop the electric motor 72.

Figure 4:
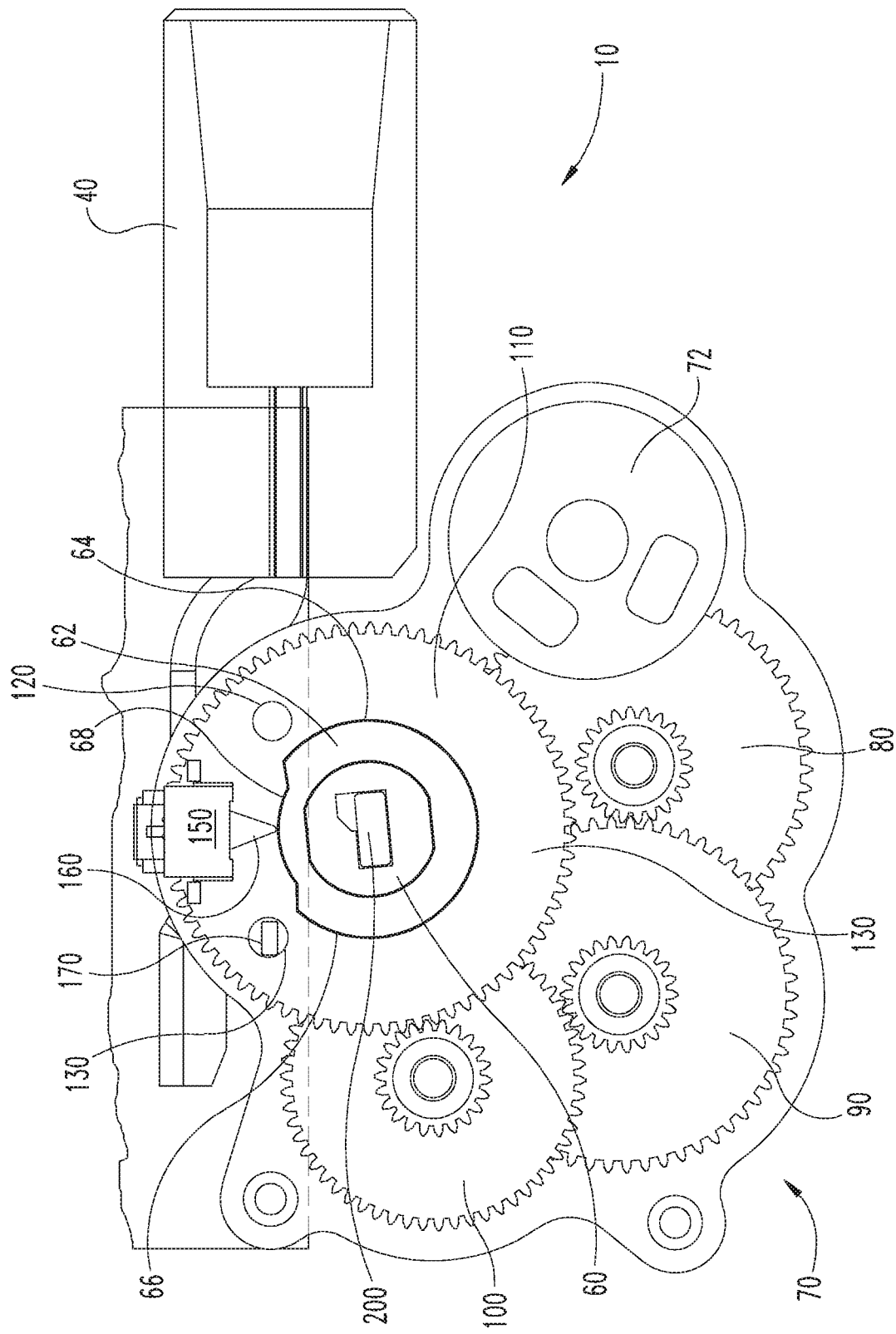
FIG. 4 is a cross sectional view of the deadbolt drive assembly of FIG. 1 with the deadbolt in a retracted or unlocked position with the final gear in the home position.

Referring now to FIG. 4, the deadbolt drive assembly 10 is shown in similar configuration as FIG. 3, with the deadbolt 40 in a retracted or unlocked position, however the final gear 110 has been rotated to a home position such that the second magnet 130 is aligned with the primary magnetic sensor 170. As explained above, in this position, the thumb-turn shaft 200 can independently rotate the output shaft 60 through manual operation to lock or unlock the deadbolt 40.

Figure 5:
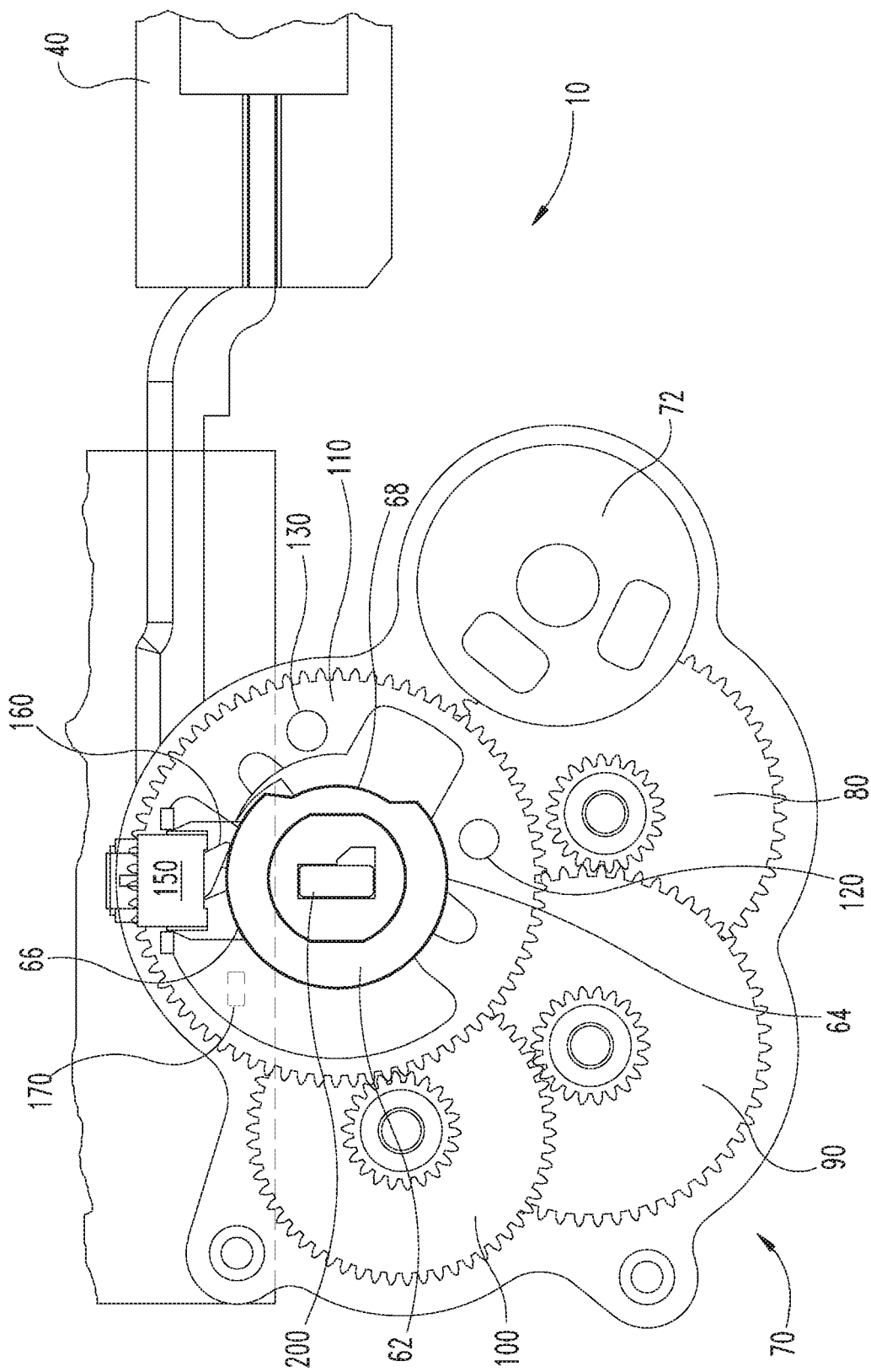
FIG. 5 is a cross sectional view of the deadbolt drive assembly of FIG. 1 with the deadbolt in an extended or locked position with the final gear angularly displaced from the home position.

Referring now to FIG. 5, a cross-section view of the deadbolt drive assembly 10 is shown with the deadbolt 40 in an extended or locked position. The left hand profile 66 of the cam 62 is engaged with the pivot finger 160 causing the flipper switch 150 to signal to the controller 140 that the deadbolt 40 is in the extended position. Neither the first magnet 120 nor the second magnet 130 is aligned with the primary magnetic sensor 170 therefore the deadbolt drive assembly 10 is not located in the home position and the thumb-turn shaft 200 cannot be manually actuated in this configuration.

Figure 6:
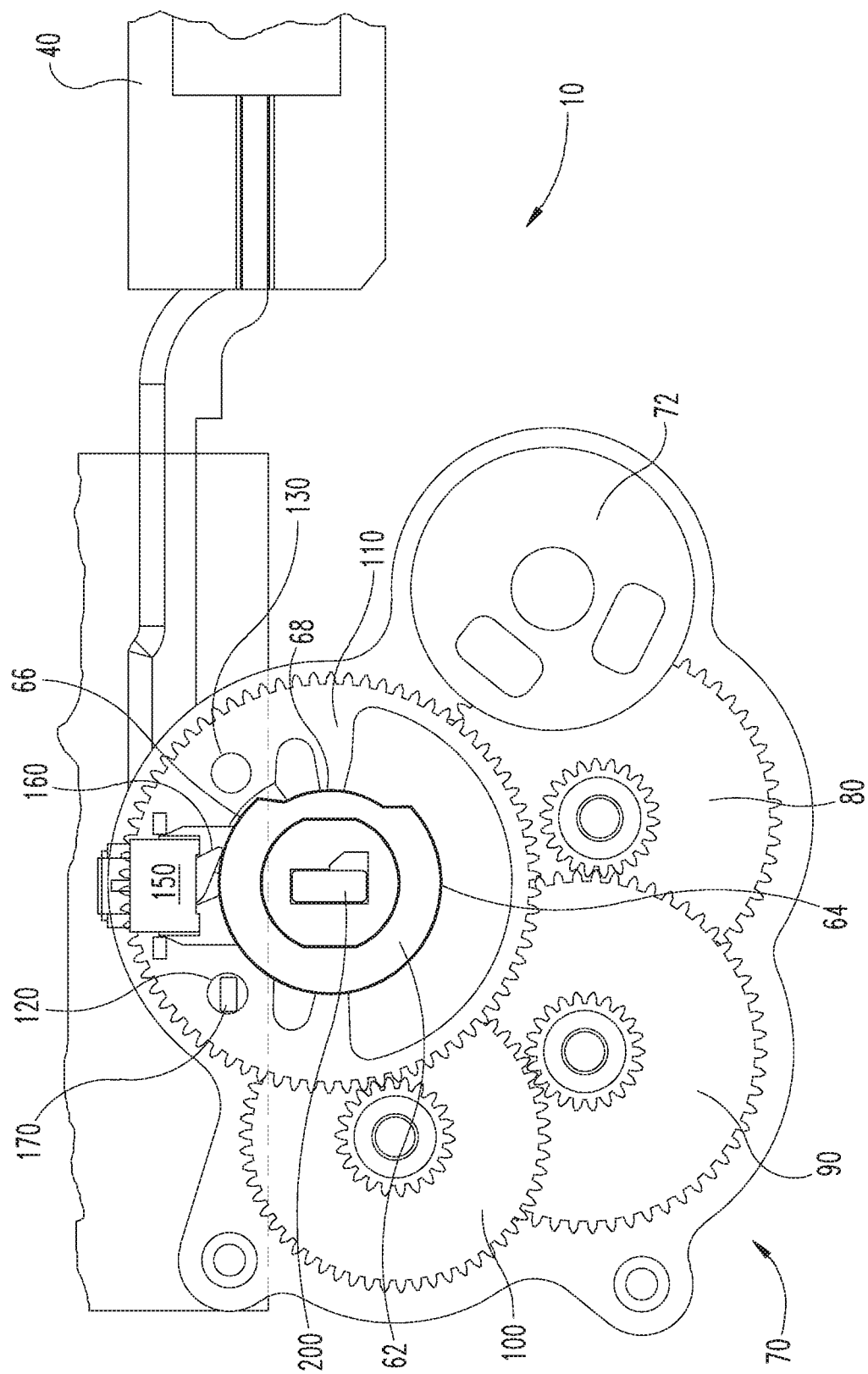
FIG. 6 is a cross sectional view of the deadbolt drive assembly of FIG. 1 with the deadbolt in an extended or locked position with the final gear in the home position.

Referring now to FIG. 6, after the control system moves the deadbolt 40 to the extended position to lock the deadbolt drive assembly 10 as shown in FIG. 5, the control system reverses the direction of rotation of the final gear 110 so as to align the first magnet 120 or the second magnet 130, depending on the hand configuration, with the primary magnetic sensor 170. The pivot finger 160 of the flipper switch 150 remains pivoted towards the right thus confirming that the deadbolt 40 is still in the extended or locked position, however the thumb-turn shaft 200 is now disengaged from the final gear 110, and thus the thumb-turn shaft 200 can be manually actuated to lock or unlock the deadbolt 40.

Figure 7:
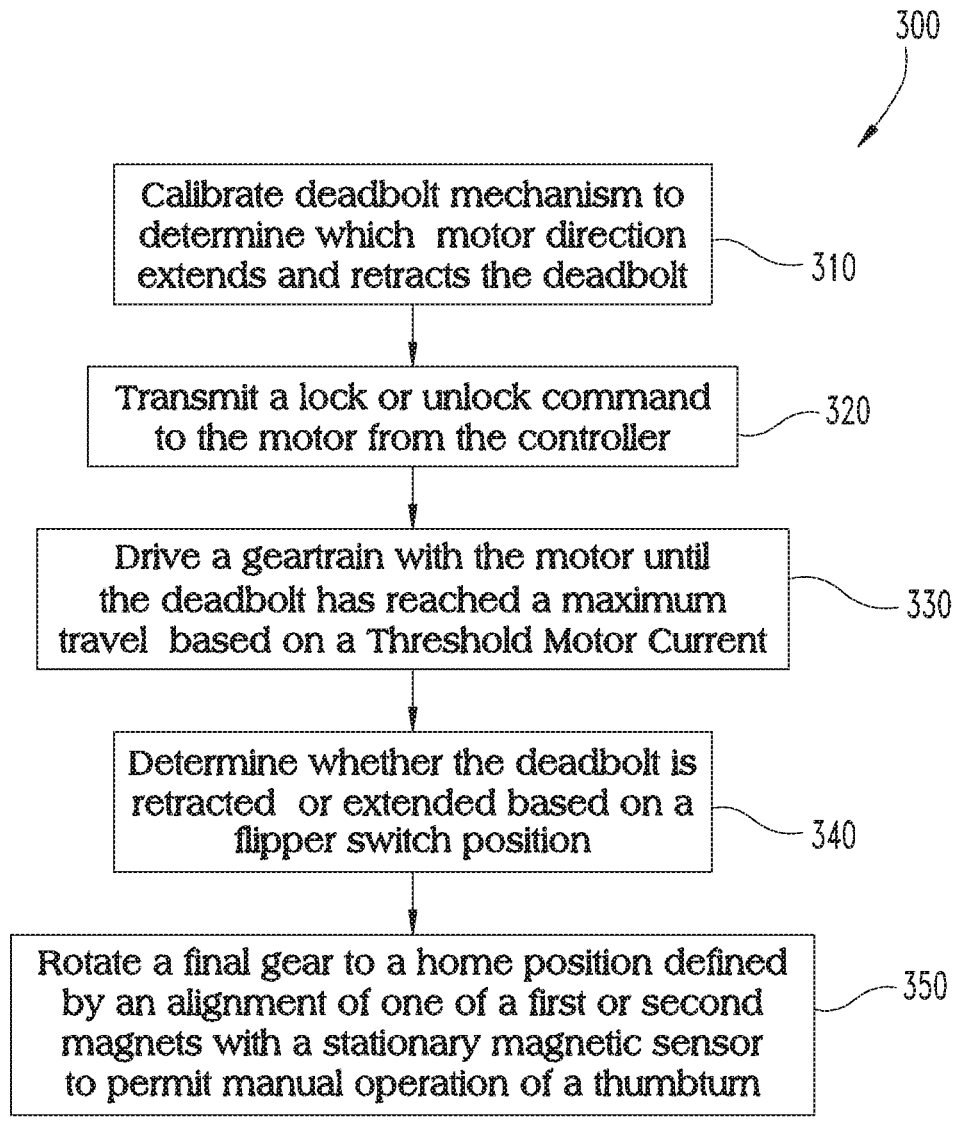
FIG. 7 is a flow chart showing an exemplary method of operation for the deadbolt drive assembly of FIG. 1.

Referring now to FIG. 7, a flow chart illustrates a method of operation 300 for the deadbolt assembly 10. At step 310, the control system calibrates the deadbolt mechanism 20 to determine which motor direction extends and retracts the deadbolt 40. The direction for extending and retracting depends on whether the deadbolt assembly 10 is in a left hand or right hand location. The calibration procedure is described in more detail below. After the calibration is completed, a lock or unlock command can be transmitted to the motor 72 from the controller at step 320. Upon receiving the lock or unlock command, the controller at step 330 will cause the motor to rotate to drive a gear train 70 in a direction as determined in the calibration step. The electric motor 72 will continue rotation until the deadbolt 40 has reached a maximum travel as determined by a threshold motor current. The maximum travel will be in either a completely extended position or a completely retracted position depending on whether a lock or unlock command was sent. It should be understood that the control system may receive commands from an electronic input controller through wired or wireless means. Further, any standard or nonstandard electronic input control may be used. Non-limiting examples include, keypad, card reader, smart phone, personal computer, key fob or other similar electronic inputs. Either of the fully extended or retracted positions will prevent further movement of the gears which will cause the motor current to increase such that the control system will then shut off the power to the electric motor 72. At step 340, the control system determines whether the deadbolt 40 is in a retracted or extended position depending on the position of pivot finger 160 of the flipper switch 150. At step 350, the control system will reverse the rotation of the final gear until located in the home position defined by an alignment of the first magnet 120 or the second magnet 130 with a primary magnetic sensor. A thumb-turn can then be manually actuated as desired to lock or unlock the deadbolt.

Referring back to step 310, the calibration process determines the location of the deadbolt 40 and whether the deadbolt 40 is fully extended or retracted. The calibration process verifies the magnitude and polarities of the embedded magnets and whether the deadbolt 40 is attached to the deadbolt drive assembly 10. The calibration process will also determine which motor direction extends or retracts the deadbolt 40. The calibration begins by running the motor in one direction to the end of travel based on reaching a threshold motor current. The control system verifies whether the deadbolt is in extended or retracted positions based on whether the flipper switch 150 is engaged and pivoted or disengaged from the cam profile of the cam 62. The control system then commands the electric motor to run in an opposite direction until the motor current reaches a threshold value indicating an end of travel of the deadbolt 40. During this operation, the magnitude and polarities of the embedded magnets 120, 130 will be sensed by the primary magnetic sensor 170 and transmitted to the control system. The deadbolt 40 is then verified in the opposite state of the original extension or retraction to confirm that the deadbolt moved from a retracted position to an extended position, or vice versa. If in the original calibration step, the deadbolt state was in an extended position, the first magnet detected is the home magnet. If in the original calibration step, the deadbolt was in a retracted position then the second magnet will be defined as the home magnet. The first magnet detected during a rotation when the final gear is moved to a home position is defined as the home magnet.

Several faults in the system will cause the calibration to fail. If the deadbolt location state is not different when the motor runs in opposite directions during the calibration, then calibration will fail. Also, if the magnitude of the embedded magnets does not pass a threshold minimum, then the calibration fails. If an end of travel is not detected within a predefined time limit, then the calibration fails. If the motor fails to operate when commanded to do so, then the calibration will fail In one aspect, the present disclosure includes a deadbolt assembly comprising: a deadbolt housing; a deadbolt slidingly engaged within the deadbolt housing; a final gear having a first magnet and a second magnet attached thereto; a primary sensor operable to sense a magnetic flux of the first and second magnets; wherein the first magnet indicates a home position for a right handed deadbolt and the second magnet indicates a home position for a left handed deadbolt; and a flipper switch configured to determine whether the deadbolt is extended or retracted.

In refining aspects, the first magnet is fixed to the final gear at a first polarity and the second magnet is fixed to the final gear with a second polarity opposite to the first; further comprising an electric motor operable to rotate the final gear about an axis of rotation; further comprising a plurality of gears operably coupled between the electric motor and the final gear; further comprising an output shaft connected between the final gear and the deadbolt; further comprising a cam coupled to the output shaft; wherein the cam includes a cam profile engageable with the flipper switch; wherein the profile includes: a first portion indicating the deadbolt is positioned in an unlocked or retracted position; a second portion indicating the deadbolt is positioned in a locked or extended right hand position; and a third portion indicating the deadbolt is positioned in a locked or extended left hand position; further comprising a pivot finger extending from the flipper switch, the pivot finger constructed to engage with the cam profile at predetermined locations, wherein the pivot finger pivots counter clockwise when the deadbolt is extended in a right hand configuration and the pivot finger pivots clockwise when the deadbolt is extended in a left hand configuration; further comprising a control processor in electrical communication with the flipper switch; further comprising a secondary sensor operable to detect a tampering magnetic source; and wherein the primary sensor and the secondary sensor are hall effect sensors.

Another aspect of the present disclosure includes a method comprising: transmitting a lock or an unlock command to an electric motor from a controller; rotating a final gear with an electric motor until a deadbolt operably connected thereto has reached a maximum travel based on a threshold motor current; rotating the final gear in reverse direction until a home position is reached by final gear, wherein the home position is defined by aligning a home magnet on a final gear with a primary magnet sensor; disengaging a thumb-turn shaft from the final gear when the final gear is rotated to the home position; and manually actuating a thumb-turn to lock or unlock the deadbolt after return to the home position.

In refining aspects, the method includes determining whether the deadbolt is extended or retracted based on a pivot angle of a pivot finger extending from a flipper switch; further comprising engaging the pivot finger with a cam associated with an output shaft; further comprising sensing a presence of an external tamper magnet and preventing the deadbolt from unlocking after sensing the tamper magnet; and further comprising sending command signals to the controller through hard wired and/or wireless devices.

Another aspect of the present disclosure includes a method for calibrating an electronic deadbolt assembly comprising: orienting a first magnet on a final gear with either a positive pole or a negative pole facing a primary magnet sensor; orienting the second magnet on the final gear with an opposite facing pole to that of the first magnet; running the motor in one direction until an end of travel signal is received by a controller, the end of travel signal corresponding to a first threshold motor current; verifying whether the deadbolt is extended or retracted based on a position of a flipper switch relative to a cam on an output shaft; running the motor in an opposite direction until a second end of travel signal is received by the controller, the second end of travel signal corresponding to a second threshold motor current; verifying that the deadbolt is in an opposite state to that of the previous deadbolt position, the verification based on the position of the flipper switch; storing the polarity of the first and second magnets during each of the verifying steps; identifying which of the first and second magnets is the home magnet; and determining whether the deadbolt is extended or retracted based on the pivot direction of the pivot finger and the threshold current transmitted from the electric motor.

Another aspect of the present disclosure includes a deadbolt configured to extend or retract between a locked position and an unlocked position, respectively; an output shaft connected between a final gear and the deadbolt; a first magnet and a second magnet connected to the final gear; a cam positioned on the output shaft; a flipper switch engageable with the cam; an electric motor operable for rotating the final gear; a primary magnet sensor configured to sense a location of each of the first and second magnets during rotation of the final gear; and an electronic controller in electrical communication with the primary magnet sensor, the flipper switch and the electric motor.

In refining aspects, the first and second magnets are oriented with opposite polarities facing the primary magnet sensor; wherein the first and second magnets are positioned on the final gear so as to indicate a home position for either a left hand deadbolt or a right hand deadbolt; wherein the output shaft is free to rotate via thumb-turn when the final gear is in the home position; further comprising a secondary magnet senor configured to detect a tampering magnetic flux.

It should be understood that the component and assembly configurations of the present disclosure can be varied according to specific design requirements and need not conform to the general shape, size, connecting means or general configuration shown in the illustrative drawings to fall within the scope and teachings of this patent application.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A bolt assembly, comprising:
   a housing;
   a bolt slidably mounted to the housing for movement between an extended position and a retracted position;
   a gear train engaged with the bolt and operable to move the bolt between the extended position and the retracted position;
   at least one magnet mounted to the gear train;
   a primary sensor operable to detect a handedness of the bolt assembly based on a magnetic flux generated by the at least one magnet; and
   a switch configured to detect the extended position and/or the retracted position of the bolt.

2. The bolt assembly of claim 1, wherein the at least one magnet is mounted to a final gear of the gear train.

3. The bolt assembly of claim 1, wherein the at least one magnet comprises:
   a first magnet that indicates a home position for a right-handed bolt; and
   a second magnet that indicates a home position for a left-handed bolt.

4. The bolt assembly of claim 3, wherein the first magnet is fixed to the gear train and has a first polarity; and
   wherein the second magnet is fixed to the gear train and has a second polarity opposite the first polarity.

5. The bolt assembly of claim 1, further comprising an electric motor operable to drive the gear train to move the bolt between the extended position and the retracted position.

6. The bolt assembly of claim 1, further comprising a secondary sensor operable to detect a tampering magnetic source.

7. The bolt assembly of claim 1, further comprising a cam coupled with the gear train;
   wherein the cam is engaged with the switch and includes:
      a first portion that indicates the bolt is in the retracted position;
      a second portion that indicates the bolt is in the extended position while in a right-handed orientation; and
      a third portion that indicates the bolt is in the extended position while in a left-handed orientation.

8. The bolt assembly of claim 7, wherein the switch comprises a pivot finger operable to engage the cam;
   wherein the pivot finger is in a neutral position when aligned with the first portion;
   wherein the pivot finger is in a first pivoted position when engaged with the second portion; and
   wherein the pivot finger is in a second pivoted position opposite the first pivoted position when engaged with the third portion.

9. A bolt assembly, comprising:
   a housing;
   a bolt slidably mounted to the housing for movement between an extended position and a retracted position, the bolt having one of a right-handed orientation and a left-handed orientation;
   a gear train engaged with the bolt and operable to move the bolt between the extended position and the retracted position;
   a cam mounted to the gear train, the cam including a first portion, a second portion, and a third portion; and
   a switch including a pivot finger operable to engage the cam;
   wherein, with the pivot finger aligned with the first portion, the pivot finger is in a neutral position and indicates that the bolt is in the retracted position;
   wherein, with the pivot finger engaged with the second portion, the pivot finger is in a first pivoted position and indicates that the bolt is in the extended position and the right-handed orientation; and
   wherein, with the pivot finger engaged with the third portion, the pivot finger is in a second pivoted position and indicates that the bolt is in the extended position and the left-handed orientation.

10. The bolt assembly of claim 9, wherein the cam is mounted to an output shaft operable to move the bolt between the extended position and the retracted position.

11. The bolt assembly of claim 10, further comprising a gear train and an electric motor operable to drive the gear train; and
   wherein the output shaft is coupled to a final gear of the gear train.

12. The bolt assembly of claim 11, further comprising:
   a first magnet mounted to the gear train; and
   a primary sensor configured to detect one of the right-handed orientation and the left-handed orientation based on a magnetic flux generated by the first magnet.

13. The bolt assembly of claim 12, further comprising a second magnet mounted to the gear train; and
  wherein the primary sensor is configured to detect the other of the right-handed orientation and the left-handed orientation based on a magnetic flux generated by the second magnet.

14. The bolt assembly of claim 9, further comprising:
 a first magnet and a second magnet mounted to a gear train engaged with the bolt; and
 a primary sensor configured to detect whether the bolt is in the right-handed orientation or the left-handed orientation based on magnetic flux generated by the first magnet and the second magnet.

15. The bolt assembly of claim 14, wherein the first magnet is mounted to the gear train and has a first polarity; and
  wherein the second magnet is mounted to the gear train and has a second polarity opposite the first polarity.

16. A method, comprising:
 transmitting a lock command and/or an unlock command to an electric motor from a controller;
 rotating a gear train with the electric motor until a bolt operably connected to the gear train has reached a maximum travel;
 rotating the gear train in a reverse direction until a home position is reached by the gear train, wherein the home position is defined by aligning a home magnet on the gear train with a primary magnetic sensor, wherein the home magnet comprises one of a first magnet and a second magnet, the first magnet indicating the home position for a right handed bolt when aligned with the primary magnetic sensor, and the second magnet indicating the home position for a left handed bolt when aligned with the primary magnetic sensor; and
 disengaging a thumb-turn shaft from the gear train when the gear train is rotated to the home position.

17. The method of claim 16, further comprising determining that the bolt has reached the maximum travel based on a threshold motor current.

18. The method of claim 16, further comprising, after return of the bolt to the home position, moving the bolt to one of an extended position and a retracted position in response to manual actuation of a thumbturn.

19. The method of claim 16, further comprising determining whether the deadbolt is extended or retracted based on a pivot angle of a pivot finger extending from a switch.

20. The method of claim 16, further comprising sensing a presence of an external tamper magnet and preventing the deadbolt from unlocking after sensing the external tamper magnet.

21. The bolt assembly of claim 9, wherein the switch is positioned at single location relative to the cam.

22. The bolt assembly of claim 9, wherein the second portion of the cam has a right hand actuation profile, the third portion of the cam has a left hand actuation profile, and the first portion of the cam has a center profile positioned between the right hand actuation profile and the left hand actuation profile.

23. The bolt assembly of claim 22, wherein the center profile is offset from a rotational axis of the cam by a first offset distance, the right hand actuation profile is offset from the rotational axis by a second offset distance, and the left hand actuation profile is offset from the rotational axis by a third offset distance; and
  wherein the first offset distance is less than the second and third offset distances.

24. The bolt assembly of claim 9, wherein the first portion of the cam is positioned between the second and third portions of the cam; and
  wherein when the pivot finger is aligned with the first portion, the pivot finger is in a non-actuated position.

25. The bolt assembly of claim 24, wherein when the pivot finger is aligned with the first portion of the cam, the pivot finger does not engage the first portion.

* * * * *